O. P. KNEE.
COMBINATION AUTOMOBILE ENGINE STARTER.
APPLICATION FILED FEB. 18, 1915.
1,149,838.
Patented Aug. 10, 1915.
3 SHEETS—SHEET 3.
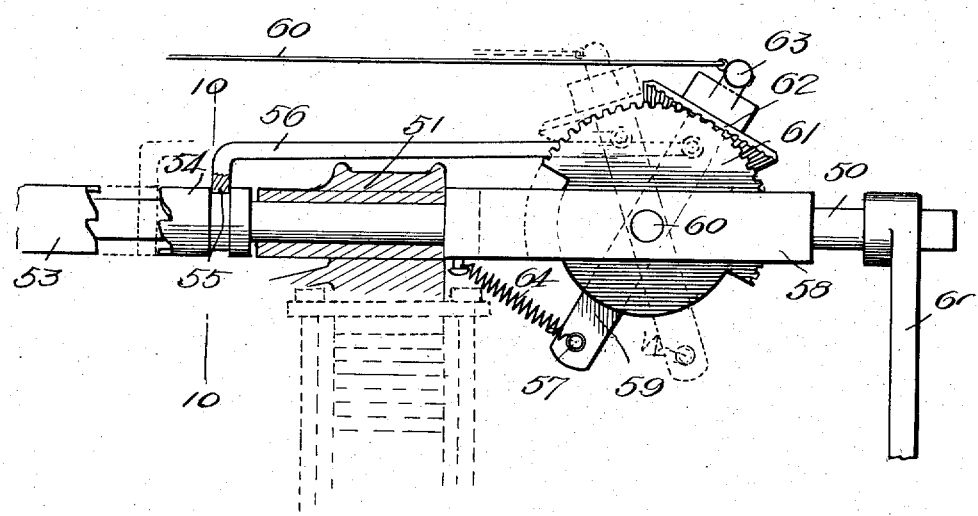
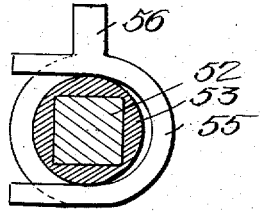
WITNESSES:
INVENTOR
Orion P. Knee
BY Munn & Co.
ATTORNEYS

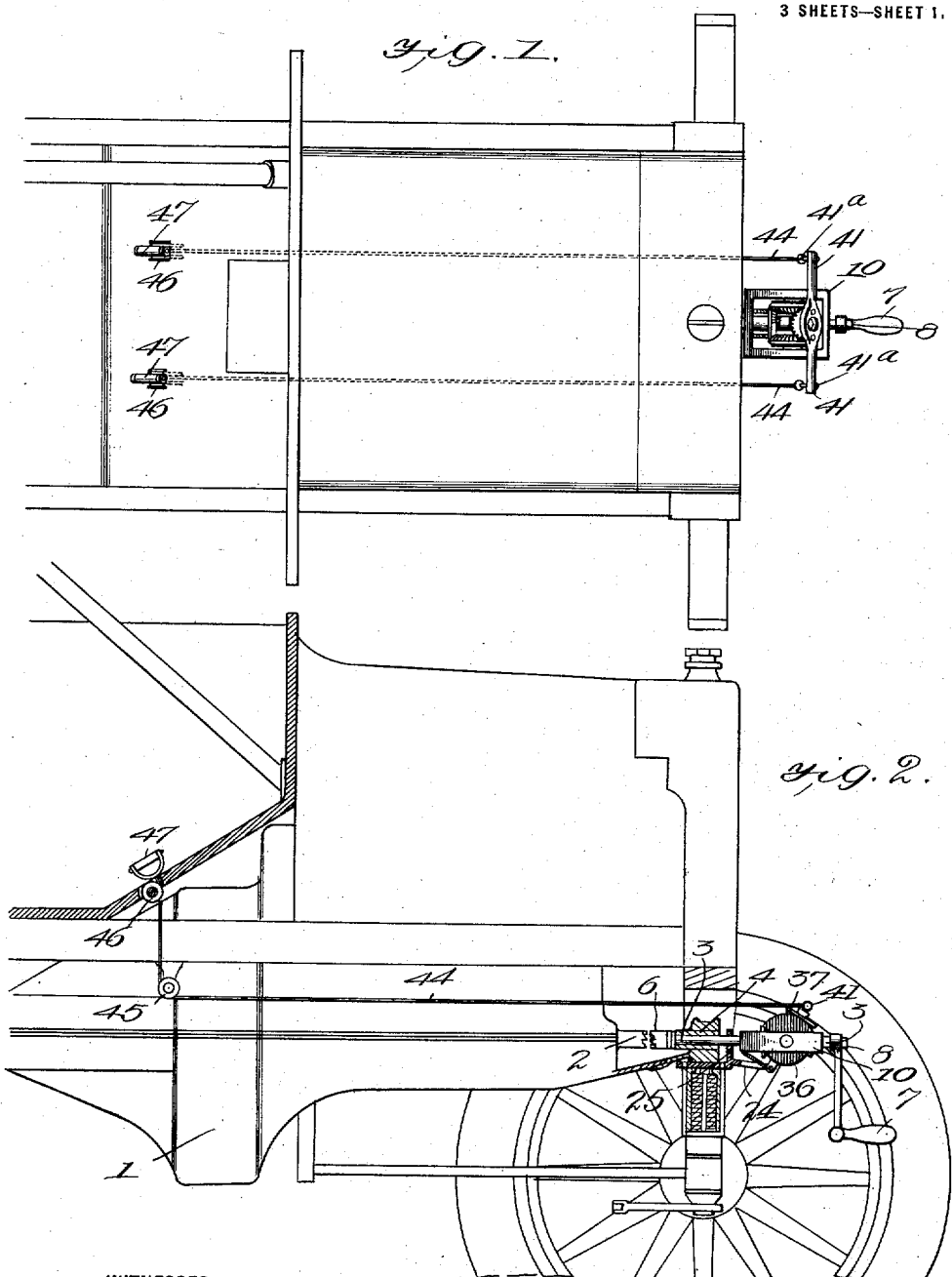

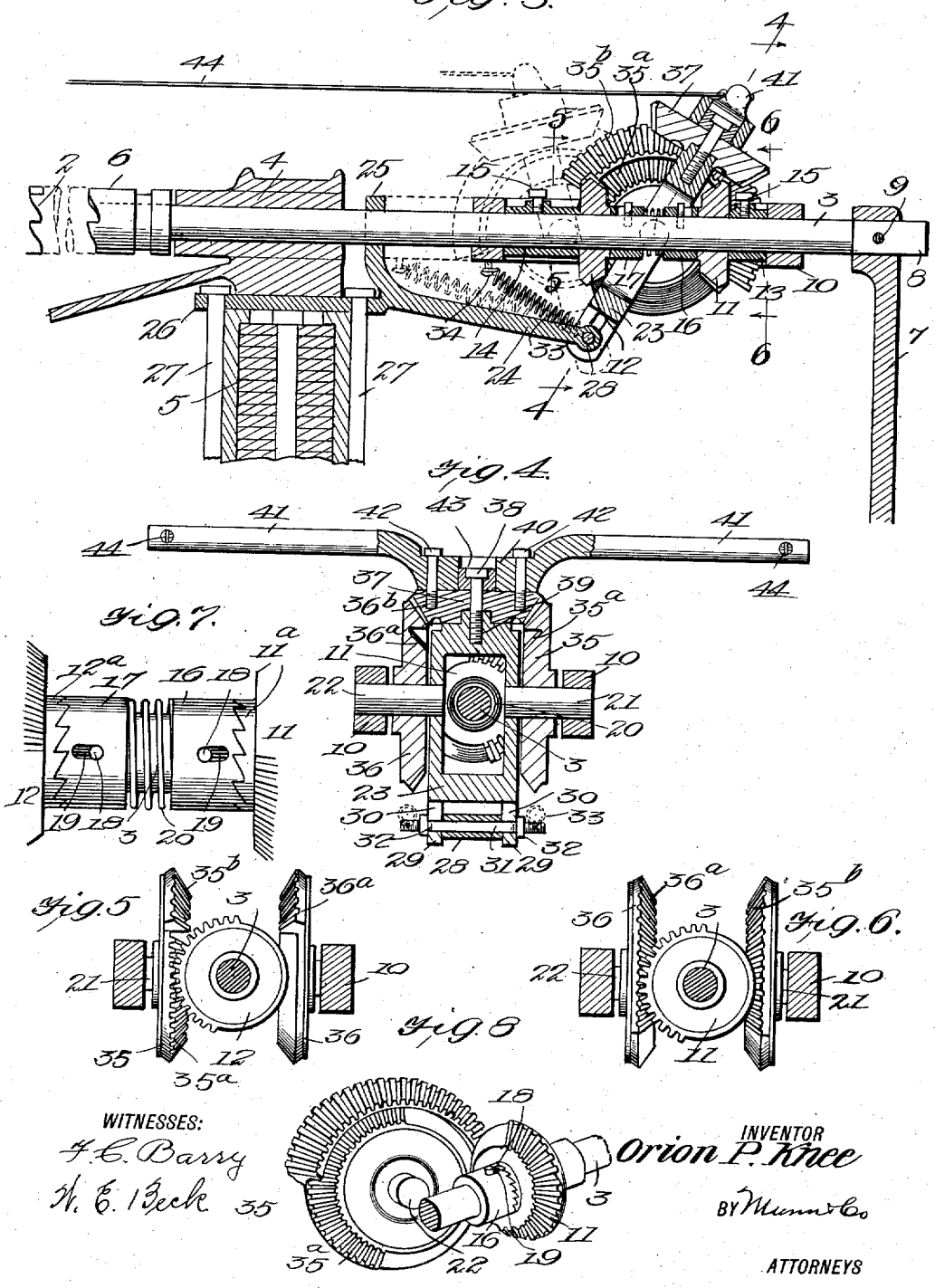

UNITED STATES PATENT OFFICE.

ORION P. KNEE, OF LINCOLN, NEBRASKA.

COMBINATION AUTOMOBILE ENGINE-STARTER.

1,149,838.  Specification of Letters Patent.  Patented Aug. 10, 1915.

Application filed February 18, 1915. Serial No. 9,058.

*To all whom it may concern:*

Be it known that I, ORION P. KNEE, a citizen of the United States, and a resident of Lincoln, in the county of Lancaster, and State of Nebraska, have made certain new and useful Improvements in Combination Automobile Engine-Starters, of which the following is a specification.

My invention is an improvement in combination automobile engine starters and has for its object to provide mechanism of the character specified capable of attachment to existing motor vehicles, and having means for engaging the starting shaft for rotating the said shaft and capable of being operated from the driver's seat.

In the drawings, Figure 1 is a top plan view of the front of an automobile provided with the improved starter, Fig. 2 is a side view with parts in section, Fig. 3 is an enlarged vertical section through the starting mechanism, Figs. 4, 5 and 6 are sections on the line 4—4, 5—5, and 6—6 respectively Fig. 3, each looking in the direction of the arrows adjacent to the line, Fig. 7 is a top plan view of the clutch connection, Fig. 8 is a partial perspective view of the gearing, Fig. 9 is a view similar to Fig. 3 showing a modified construction, and Fig. 10 is a section on the line 10—10 of Fig. 9.

The embodiment of the invention shown in Figs. 1 to 8 inclusive is shown in connection with a motor vehicle 1, the starting device being arranged at the front of the hood, and at the engine shaft, the said engine shaft carrying at its front end a clutch portion 2, with which the starting mechanism to be described engages. The starting shaft 3 is arranged in alinement with the engine shaft, the starting shaft being journaled in a bearing 4 on the front spring 5, and the inner end of the shaft is provided with a clutch portion 6 for coöperating with the portion 2 on the engine shaft to cause the engine shaft to rotate forwardly when the crank shaft is rotated forwardly and to permit the engine shaft to move freely forwardly without affecting the crank shaft.

The engine shaft is normally pressed forward to disengage the clutch sections 2 and 6 and the said starting shaft is movable longitudinally in its bearing 4 to permit the clutch sections to be engaged to start the engine. The usual crank 7 is engaged with the outer end of the crank shaft, the said crank having a polygonal opening for engaging a polygonal portion 8 at the front end of the crank shaft and the crank is pinned to the crank shaft by a pin 9. The improved starting mechanism is supported by a substantially rectangular open frame 10 having at its ends bearings through which the crank shaft extends and the frame is arranged between the bearing 4 and the crank.

Within the frame a pair of bevel gears 11 and 12 is journaled on the shaft, and sleeves 13 and 14 are arranged between the respective gears and the adjacent end members of the frame, each sleeve being rigidly connected with the shaft by means of a set screw 15 which passes through a threaded opening in the sleeve and engages the crank shaft. Each of the bevel gears carries on the face adjacent to the other gear a clutch section, indicated at 11ª and 12ª respectively, the said clutch section being formed on the ends of the hubs of the gear wheels, and each clutch section is adapted for engagement with a clutch section mounted on the crank shaft, a clutch section 16 being arranged adjacent to the section 11ª, while a clutch section 17 is arranged adjacent to the clutch section 12ª. The clutch sections 16 and 17 are movable longitudinally of the crank shaft, are constrained to locate therewith, and are limited as to their longitudinal movement by means of set screws 18 threaded into the openings in the shaft and engaging slots 19 extending longitudinally of the clutch section.

The slots 19 are of sufficient length to permit the respective clutch sections to move into and out of engagement with the adjacent sections of the bevel gears and the bevel gears 11 and 12 are spaced apart from each other a sufficient distance to permit the clutch sections 16 and 17 to simultaneously disengage the bevel gear. The sections are normally pressed toward the bevel gears by a coil spring 20 which encircles the crank shaft between the sections 16 and 17, and bears against the respective ends of the sections.

Stub shafts 21 and 22 are journaled in alinement transversely of the frame, each stub shaft being journaled at its outer end in the adjacent side member of the frame 10 and the inner end of each stub shaft is fixed in an opening of a substantially rectangular open frame 23 arranged with its plane transverse to the crank shaft. The frame 23 is arranged in an approximately vertical position and the said frame is mounted to swing with respect to the bearing 4, on a bracket which is rigidly connected to the said bearing at one end and is pivoted or hinged to the frame at the other. The bracket consists of a portion 24 having at its rear end an upstanding cross head 25, and having a lug 26 extending inwardly or rearwardly from the plate at its junction with the cross head 25. The plate 24, the cross head, and the lug are integral and the lug is received between the bearing 4 and the spring and is rigidly connected to the bearing spring by means of bolts 27 which pass through openings in the lug.

The cross head 25 has a central opening through which the crank shaft extends and at its front end the plate 24 is provided with a bearing sleeve 28 which is received between a pair of depending lugs 29 on the lower end of the frame 23. Each of the said lugs is slotted longitudinally as indicated at 30, and a bolt 31 having its ends oppositely threaded is passed through the slots of the lugs and through the bearing 28 and the ends of the bolt are engaged by nuts 32 outside of the lugs. Each end of the bolt has an opening outside of the nut and one end of a coil spring 33 is connected with each of the openings, the other end of the spring being connected to a pin 34 on the innermost end member of the frame 10. The springs 33 act normally to move the frame 10 and the parts which it supports outwardly or forwardly and since the frame cannot move longitudinally of the crank shaft because of the sleeves 13 and 14, the crank shaft is carried with the frame when the frame is moved.

Bevel gear wheels to be later described in detail and indicated generally by the reference characters 35 and 36 are secured on the respective stub shafts 21 and 22 between the said members of the frame 10 and those of the frame 23, and a third bevel gear 37 is journaled on the upper end member of the frame 23. It will be noticed from an inspection of Fig. 4 that a set screw 38 is passed through the center of the bevel gear 37 and engages an internally threaded boss 39 in the upper face of the upper end member of the frame 23. A cross head comprising a body 40 and arms 41 is connected to the bevel gear 37, the body of the cross head being arranged on the outer face of the bevel gear, and the said body is secured to the bevel gear by set screws 42.

The body has a central opening at the axis of the bevel gear 37 and at the set screw 38 and a counterbored washer 43 is held in the opening, the said screw passing through the washer, and the head of the set screw engages the counterbore. Thus the cross head is rigidly connected with the bevel gear 37 and the arms extend in opposite directions approximately transverse to the shaft 3. Each arm has an opening in its end and a flexible member 44 is connected to each arm, each of the said members being connected to an eye 41ᵃ engaging the opening of the adjacent arm.

The flexible members 44 extend rearwardly beneath the hood to a pulley 45 which is journaled on the frame of the vehicle adjacent to the foot board thereof and below the foot board, and each flexible member then passes upwardly from the pulley over a second pulley 46 which is journaled in a slot in the foot board. A handle 47 is secured to each flexible member on the upper face of the foot board and the handles normally rest in a position shown in Figs. 1 and 2 in position to be grasped by the driver to operate the starting mechanism.

It will be evident that when traction is made on the flexible members they will be drawn rearwardly and will swing the upper end of the frame 23 rearwardly. Since this frame is connected to the frame 10 by the stub shafts 21 and 22 the frame 10 and the crank shaft 3 will also be moved rearwardly to cause the clutch sections 2 and 6 to engage each other.

It will be noticed from an inspection of Figs. 5 and 6 especially that each bevel gear 11 and 12 is a mutilated gear having teeth approximately only over 180° of its periphery. Each of the bevel gears 35 and 36 has two series of bevel gear teeth, the series having unequal radii. The bevel gear 35 has an inner series 35ᵃ of teeth and an outer series 35ᵇ, while the bevel gear 36 has an inner series 36ᵃ and an outer series 36ᵇ. The series 35ᵇ and 36ᵇ of teeth mesh with the teeth of the bevel gear 37 while the teeth of series 35ᵃ and 36ᵃ mesh with the teeth of the bevel gears 11 and 12.

The operation of the improved starter is as follows: The operator grasps the handles 47 and draws the flexible member rearwardly. This operation swings the upper end of the frame 23, which may be termed a rocker, rearwardly, moving the shaft 3 rearwardly and causing the clutch sections 2 and 6 to mesh. The operator now imparts an oscillating movement to the cross head 41—43, by moving the handles forwardly and rearwardly in alternation, that is, with a see-saw movement. Whenever the cross head is oscillated in this manner, the gear wheels 35 and 36 will be oscillated in opposite directions, and the gear wheels in turn will impart an oscillating movement to the bevel gears 11 and 12 in opposite directions. When the bevel gears 11—12 are moved in a direction to cause the shaft 3 to move forwardly, the shaft will be carried with the wheels while when the said wheels move in the opposite directions the clutch sections 16 and 17 will move idly over the adjacent sections 11ª and 12ª. The bevel gear 37 meshes with the teeth 35ᵇ and 36ᵇ of the gears 35 and 36, and the teeth 35ª and 36ª of these gears mesh in turn with the teeth of gears 11 and 12. When the gear 37 is oscillated in opposite directions the gears 11 and 12 will be oscillated in opposite directions, but they will only move the shaft 3 forwardly. The rearward movement of the handles simultaneously is for engaging the clutch sections 2 and 6, while the see-saw or oscillating movement of the cross head is for the purpose of starting the engine. The spring 20 normally holds the clutch sections 16 and 17 in mesh with the sections 11ª and 12ª, but permit sections 16 and 17 to release the sections 11ª and 12ª when the gear wheels 11 and 12 move rearwardly with respect to the sections 16 and 17. Three or four forward and backward movements of the handles 47 will start the engine, and should the engine back fire the clutch sections 2 and 6 will release. Should for any reasons the sections 2 and 6 fail to release, the rearward movement of the shaft 3 will not affect the gears 11 and 12. As soon as the handles 47 are released the springs 33 return the rocker and connected parts to the full line position of Fig. 3. The operative position of the rocker and connected parts is shown in dotted lines in this figure.

It will be understood that the mounting for the starter shown is that for connecting the starter on the Ford automobile. The device, however, can be connected to any car by providing the proper form of connection, and the starter may be used in three different ways: first, as a combination crank and mechanical starter, by mounting the starter as shown in Figs. 1 to 3 of the drawings; second, by removing the bracket 24—25—26, and connecting the frame 10 directly to the car, this arrangement being shown in Figs. 9 and 10, and third, by mounting the device as shown in Figs. 1 to 3, removing the cross head, and using the crank 7 to start the engine. When the crank is pressed inward, the clutch sections 2 and 6 will be engaged, and the crank shaft may be rotated to rotate the engine.

With the second arrangement shown in Figs. 9 and 10 the crank shaft 50 which may be a continuation of the engine shaft is journaled in the bearing 51 corresponding to the bearing 4 in Fig. 3. The said shaft is polygonal in cross section at its junction with the engine shaft, and a clutch section 53 is arranged on the shaft at the polygonal portion. A second clutch section 54 is mounted to slide on the polygonal portion and this clutch section has an annular groove in which is received a ring 55. One end of a lever 56 is connected to the ring, and the other end is pivoted to the upper end of the rocker frame 59. The frame 58 corresponding to the frame 10 of the first mentioned construction is arranged on the crank shaft with its inner end in contact with the upper end of the bearing 51.

The rocker frame indicated at 59 and corresponding to the frame 23 of Figs. 1 to 4 is journaled on the stub shafts 60, corresponding to the stub shafts 21 and 22, the said stub shafts being journaled in the frame 58, and the gear wheels 61 are secured to the stub shafts and mesh with the gear wheels 62 in the same manner as the gear wheels 35 and 36 are secured to their stub shafts and mesh with the gear wheel 37. The flexible members 60 are connected to the cross head 63, and the rocker is normally held in the full line position of Fig. 9 by springs 64 corresponding to the spring 33. The crank 65 is shown as mounted on the crank shaft and the operation of this arrangement is as follows: When the flexible members 60 are pulled toward the driver the rocker is swung into the dotted line position of Fig. 9 and the lever 56 pushes the clutch section 53 toward the section connecting the said section so that when the crank shaft 50 is rotated forwardly the engine shaft 52 will also be rotated forwardly. After the rocker has been swung into the dotted line position of Fig. 9, connecting the clutch sections 53 and 54 the cross head is oscillated, by imparting a see-saw movement to the same, and the gear wheel 62 will rotate the shaft 50 through the gear wheels 61, it being understood that the mechanism carried by the frame 58 is precisely the same as that carried by the frame 10. When the flexible members 60 are released the springs 64 swing the upper end of the rocker forward, moving the clutch section 53 away from the section 54 and disconnecting the engine shaft and the starter shaft. Should the engine backfire with the parts arranged in the manner shown, it will not affect the starter shaft, the sections 53 and 54 releasing when the engine shaft moves backward.

I claim:—

1. An engine starter comprising in combination with the engine shaft and the starting shaft having coöperating clutch sections for constraining the engine shaft to move forwardly with the starting shaft and for permitting the engine shaft to move forward freely independently of the starting shaft, said starting shaft being mounted for longitudinal movement toward and from the engine shaft to engage and disengage the clutch sections, a fixed support in which the shaft is journaled and longitudinally movable, a rocker comprising a substantially rectangular frame through which the starting shaft extends, said rocker being pivoted at its lower end below the shaft to the support, a second frame having bearings in its ends for the starting shaft, and the starting shaft being journaled longitudinally of the frame, the rocker extending through the frame, alined stub shafts pivotally connecting the rocker and the frame intermediate the ends of the rocker and frame, said shafts being on opposite sides of the starting shaft, manually operated means connected with the upper end of the rocker frame for swinging the said upper end toward the engine shaft, springs for returning the rocker to normal position, oppositely arranged beveled gears journaled on the starting shaft within the frame and movable with the frame, each bevel gear having on the face adjacent to the other gear a clutch section, clutch sections on the starting shaft between the bevel gears for engagement by the sections of the gears to connect the said gears to the shaft, said sections being constrained to rotate with the shaft and being movable longitudinally thereof, a spring normally pressing the sections toward the gears, and the said sections being arranged to constrain the starting shaft to move forwardly with the bevel gears, a bevel gear on each stub shaft, a bevel gear journaled at the top of the frame on an axis radial to the stub shafts, each of the bevel gears on the stub shafts having a plurality of series of teeth, the series having unequal radii, one of the series engaging one of the first named bevel gears and the other series engaging the last named bevel gear, means in connection with the manually operated means for swinging the rocker for oscillating the bevel gear at the top of the said rocker for the purpose specified, said manually operated means comprising a cross head secured to the bevel gear journaled on the frame, and flexible members connected to the end of the cross head and adapted to extend to a distance and to be operable from a distance.

2. An engine starter comprising in combination with the engine shaft and the starting shaft having coöperating clutch sections for constraining the engine shaft to move forwardly with the starting shaft and for permitting the engine shaft to move forwardly freely independently of the starting shaft, said starting shaft being mounted for longitudinal movement toward and from the engine shaft to engage and disengage the clutch sections, a fixed support in which the shaft is journaled, a rocker comprising a substantially rectangular frame through which the starting shaft extends, said rocker being pivoted at its lower end below the shaft to the support, a second frame having bearings in its ends for the starting shaft, and the starting shaft being journaled longitudinally of the frame, the rocker extending through the frame, alined stub shafts pivotally connecting the rocker and the frame intermediate the ends of the rocker and frame, said shafts being on opposite sides of the starting shaft, manually operated means connected with the upper end of the rocker frame for swinging the said upper end toward the engine shaft, springs for returning the rocker to normal position, oppositely arranged beveled gears journaled on the starting shaft within the frame and movable with the frame, each bevel gear having on the face adjacent to the other gear a clutch section, clutch sections on the starting shaft between the bevel gears for engagement by the sections of the gears to connect the said gears to the shaft, said sections being constrained to rotate with the shaft and being movable longitudinally thereof, a spring normally pressing the sections toward the gears, and the said sections being arranged to constrain the starting shaft to move forwardly with the bevel gears, a bevel gear on each stub shaft, a bevel gear journaled at the top of the frame on an axis radial to the stub shafts, each of the bevel gears on the stub shafts having a plurality of series of teeth, the series having unequal radii, one of the series engaging one of the first named bevel gears and the other series engaging the last named bevel gear, and means in connection with the manually operated means for swinging the rocker for oscillating the bevel gear at the top of the said rocker for the purpose specified.

3. An engine starter, comprising in combination with the starting shaft movable toward and from the engine shaft, said shafts having mechanism for constraining the engine shaft to rotate forwardly with the starting shaft and for permitting the engine shaft to rotate forwardly independently of the starting shaft, of a supporting frame journaled on the starting shaft and movable longitudinally therewith, a rocker pivoted at its lower end to a fixed support, a pivotal connection between the rocker and the supporting frame intermediate the ends of the said rocker and frame and on an axis transverse to the starting shaft, oppositely arranged bevel gears journaled on the starting shaft and movable with the supporting frame, gear wheels journaled on the pivotal connection between the rocker and the supporting frame, a bevel gear journaled on the upper end of the rocker and rotatable on the rocker and between the bevel gears of the pivotal connection, each of the bevel gears on the pivotal connection having a plurality of series of teeth of unequal radius, one of the series meshing with one of the first named bevel gears and the other series meshing with the last named gear, a clutch connection between each of the first named bevel gears and the starting shaft for constraining the shaft to rotate with the gear when the gear is moved forwardly, a common means for swinging the rocker and for oscillating the bevel gear journaled thereon, and a spring for returning the rocker.

4. An engine starter comprising in combination with the starting shaft and the clutch connection between the starting shaft and the engine shaft, of a supporting frame movable longitudinally with the starting shaft and in which the said shaft is journaled, a rocker pivoted at its lower end to a fixed support and having a pivotal connection with the supporting frame intermediate the ends of the rocker and the frame, said pivotal connection being transverse to the starting shaft, a cross head pivoted to the top of the rocker, a pair of gears on the starting shaft within the supporting frame and movable therewith and with the starting shaft, a clutch connection between the gears and starting shaft for constraining the starting shaft to move forwardly with the gears, a gear wheel secured to the cross head and oscillatable therewith, a connection between the said gear and the gears on the starting shaft for alternately moving the said gears forwardly when the cross head is oscillating, and manually operated means connected with the cross head for swinging the rocker to move the starting shaft into engagement with the engine shaft and for oscillating the cross head to rotate the starting shaft forwardly.

5. An engine starter comprising in combination with the starting shaft and the clutch connection between the starting shaft and the engine shaft, of a supporting frame movable longitudinally with the starting shaft and in which the said shaft is journaled, a rocker pivoted at its lower end to a fixed support and having a pivotal connection with the supporting frame intermediate the ends of the rocker and the frame, said pivotal connection being transverse to the starting shaft, a cross head pivoted to the top of the rocker, a pair of gears on the starting shaft within the supporting frame and movable therewith and with the starting shaft, a clutch connection between the gears and starting shaft for constraining the starting shaft to move forwardly with the gears, a connection between the cross head and the gears on the starting shaft for alternately rotating said gears forwardly when the cross head is rotated, and manually operated means connected to the cross head for swinging the rocker to connect the engine and the starting shafts and for oscillating the cross head.

6. An engine starter comprising a starting shaft, a supporting frame in which the starting shaft is journaled, means for mounting the shaft for movement toward and away from the engine shaft, said shafts having a clutch connection, a rocker for moving the frame to engage the shafts, a spring for returning the frame, gear wheels journaled loosely on the starting shaft within the frame and movable with the frame, a clutch connection between each gear and the starting shaft for constraining said shaft to rotate forwardly with the gear, a gear mounted to oscillate on the rocker, a common manually operated means for swinging the rocker to connect the shafts and for oscillating the gears, and a connection carried by the frame between the said gear and the gears on the starting shaft for alternately moving the said gears forwardly when the last named gear is oscillated.

7. An engine starter comprising a starting shaft mounted for movement toward and from the engine shaft, a connection between the shafts for constraining the engine shaft to move forwardly with the starting shaft and for permitting the engine shaft to move forwardly independently of the starting shaft, a support in which the starting shaft is journaled, the support being movable with the shaft, a rocker pivoted to the support for moving the support and the starting shaft, a spring normally acting to move the starting shaft away from the engine shaft, a cross head pivoted intermediate its ends to the rocker, means connected with the opposite ends of the cross head for controlling the rocker to move the starting shaft toward the engine shaft and for oscillating the cross head on its pivotal connection, and a driving connection between the cross head and the starting shaft for turning the starting shaft forwardly when the cross head is oscillated in opposite directions.

ORION P. KNEE.

Witnesses:
JOHN W. BREWSTER,
ORIN L. WRIGHT.

Copies of this patent may be obtained for five cents each, by addressing the "Commissioner of Patents, Washington, D. C."